United States Patent [19]
Afanasiev et al.

[11] 3,792,252
[45] Feb. 12, 1974

[54] APPARATUS FOR DETERMINING THE LEVEL AND PROFILE OF A MATERIAL

[76] Inventors: Vadim Nikolaevich Afanasiev, Bolotnikovskaya ulitsa, 40, korpus 4, kv. 23; Vladimir Olegovich Gaiduchik, Mariupolskaya ulitsa, 4, kv. 47; Pavel Lukich Gruzin, ploschad Pryamikova, 6, kv. 21, all of Moscow, U.S.S.R.

[22] Filed: Nov. 23, 1970

[21] Appl. No.: 91,631

[52] U.S. Cl....... 250/43.5 FL, 250/83.3 D, 318/642
[51] Int. Cl. .......................................... G01n 23/10
[58] Field of Search... 250/43.5 FL, 83.3 R, 83.3 D, 250/201, 203 R, 43.5 D; 318/642 X

[56] References Cited
UNITED STATES PATENTS

| | | | |
|---|---|---|---|
| 3,099,744 | 7/1963 | Spooner | 250/43.5 FL |
| 3,221,168 | 11/1965 | Patterson | 250/203 R |

FOREIGN PATENTS OR APPLICATIONS

| | | | |
|---|---|---|---|
| 1,226,320 | 10/1966 | Germany | 250/43.5 FL |

Primary Examiner—Archie R. Borchelt
Attorney, Agent, or Firm—Waters, Roditi, Schwartz & Nissen

[57] ABSTRACT

An apparatus for determining the level and profile of materials, in which a collimated radiation source has a servo and produces a beam of hard electromagnetic radiation reflected from an irradiated zone on a surface being gauged and picked up from a receiving zone by a collimated detector also having a servo. The two servos are controlled by individual amplifiers in accordance with signals received from an electrically connected means for sensing relative alignment between the irradiated and receiving zones, one amplifier accepting signals corresponding to the amount of misalignment between the two zones with only one sign, according to the magnitude of which it brings down the speed of the associated controlled servo, and the other amplifier accepting signals corresponding to the amount of misalignment between the two zones.

2 Claims, 5 Drawing Figures

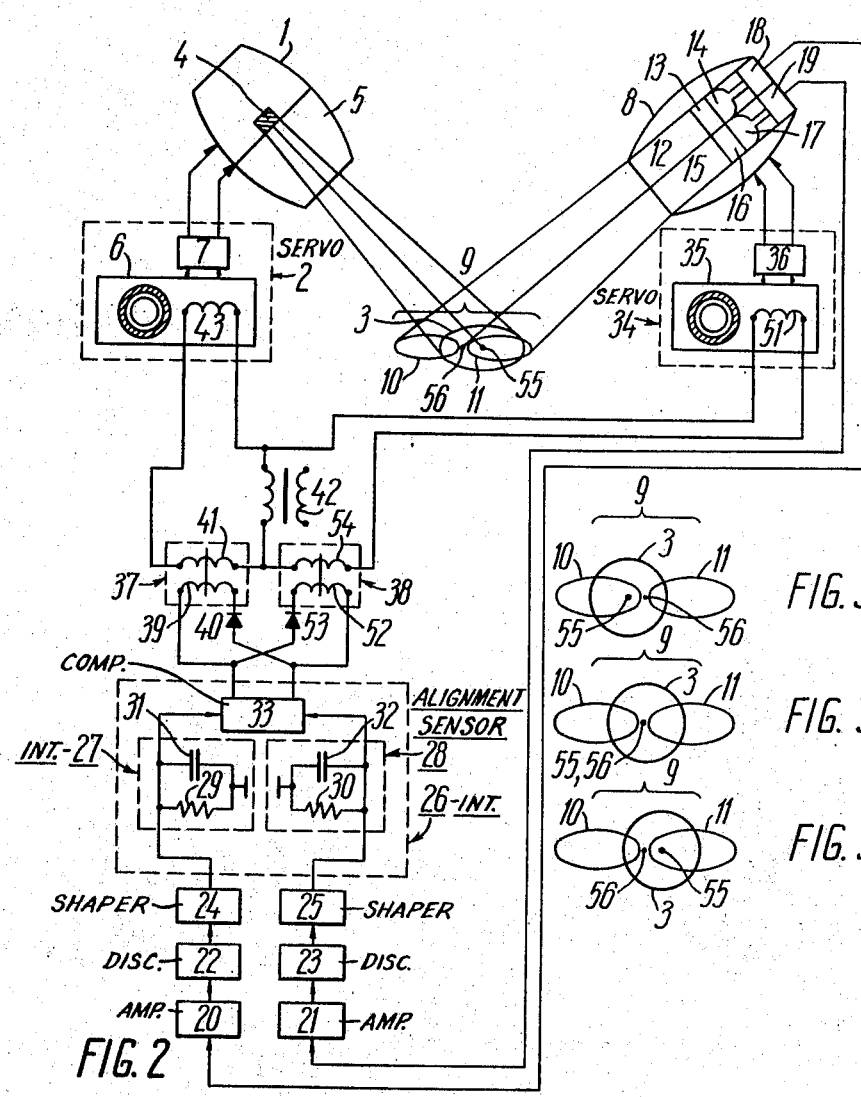

APPARATUS FOR DETERMINING THE LEVEL AND PROFILE OF A MATERIAL

The present invention relates to apparatus for non-contact determination of the level and profile of objects with the aid of hard electromagnetic radiation, and more specifically to apparatus for determining the level and profile of materials and particularly the level and profile of the stock in blast furnaces.

There exist apparatus, for determining the level and profile of materials, comprising a collimated source producing a beam of hard electromagnetic radiation reflected from the irradiated zone on the surface being gauged, and a collimated detector picking up the radiation reflected from the receiving zone, one of which is actuated by a power drive and the other by a servo controlled by an amplifier according to the signals coming from a means electrically connected to the detector and serving to sense the relative alignment of the irradiated and receiving zones, these signals corresponding to amount of misalignment between the two zones.

Among the disadvantages of said apparatus are the low speed of response and a large dynamic error of measurement caused by the fact that the radiation source is actuated to a predetermined program by a drive. Since the surface of the material being gauged is complex and unpredictable, the rate of travel of the irradiated zone produced by the collimated source varies according to an arbitrary and uncontrollable law. In the areas of the surface where the collimation axis of the radiation source is almost normal to that surface, the rate of travel of the irradiated zone is drastically reduced, while in the areas where the collimation axis of the radiation source makes large angles with the normal, the rate of travel of the irradiated zone suddenly increases. The rate of travel of the irradiated zone may rise indefinitely under the most adverse conditions for surface gauging, when the collimation axis of the radiation source is nearly at right angles to the normal to the surface. In a practical apparatus, this change in the rate of travel of the irradiated zone may lead to a large dynamic error and reduced speed of response.

The point is that in setting up a program for the travel of the collimation radiation source one can take as a guide either the average probable rate of travel of the irradiated zone or its maximum value.

In the former case, the apparatus will display a satisfactory accuracy but a markedly reduced speed of response over some areas, while over the remaining areas the dynamic error of the apparatus will be inevitably in excess of the tolerable limit owing to the fact that the actual rate of travel of the irradiated zone will be markedly greater than the average value assumed in the adjustment of the servo which brings the collimated radiation detector into alignment with the irradiated zone.

In the latter case, the servo is designed to operate at the maximum rate of travel of the irradiated zone. This implies that over practically the entire surface being gauged the apparatus will operate with a speed of response considerably lower (by a factor of 10 to 20) than is provided for by its design. Moreover, cases are likely to occur in which the dynamic error may rise to a value in excess of the tolerable limit because of inaccurate knowledge of the surface being gauged at the instant when a particular program is selected.

The above-listed disadvantages of existing apparatus manifest themselves to the full extent in cases where the collimated detector is moved to a predetermined program by a drive, and the radiation source is actuated by a servo controlled by an amplifier according to the signals coming from a means which senses the relative alignment of the irradiated and receiving zones.

It is an object of the present invention to provide an apparatus for determining the level and profile of materials with a low dynamic error.

Another object of the invention is to provide an apparatus for determining the level and profile of materials with a high speed of response.

With the above and other objects in view, in an apparatus for determining the level and profile of materials, comprising a collimated source of a radiation reflected from the irradiated zone on the surface of the material being gauged, and a collimated detector for the radiation reflected from the receiving zone of the surface of the material, the former being actuated by a drive and other by a servo controlled by an amplifier according to the signals coming from a means which senses the relative alignment of the irradiated and receiving zones and is electrically connected to the radiation detector, the signals corresponding to the amount of misalignment between the two zones; the drive, according to the invention, is a second servo having a second amplifier connected to the output of the means for sensing the relative alignment of the irradiated and receiving zones so that the amplifier accepts signals corresponding to the amount of misalignment of the two zones with only one sign according to the magnitude of which it reduces the speed of the second servo.

To secure the maximum speed of response for the apparatus disclosed herein and to simplify its construction, it is preferable to arrange its main amplifier in such a way that it accepts signals corresponding to the amount of misalignment between the irradiated and receiving zones with a sign opposite to that of the signals coming to the second amplifier, in accordance with which the main amplifier will reduce the speed of the main servo.

Owing to this arrangement, the apparatus disclosed herein has a high accuracy in gauging the level and profile of the surface under measurement, while the magnitude of the error is independent of the character of the surface being gauged. Furthermore, the apparatus has an optimum speed of response, while the time necessary to measure the coordinates of the profile is automatically adjusted as the surface varies in character in such a manner that an otpimum relation is maintained to the energy of the source used and the accuracy of gauging.

The invention will be best understood from the following description of its preferred embodiments when read in connection with the accompanying drawings wherein:

FIG. 2 is a circuit schematic of another embodiment of the same apparatus;

Figure 1:
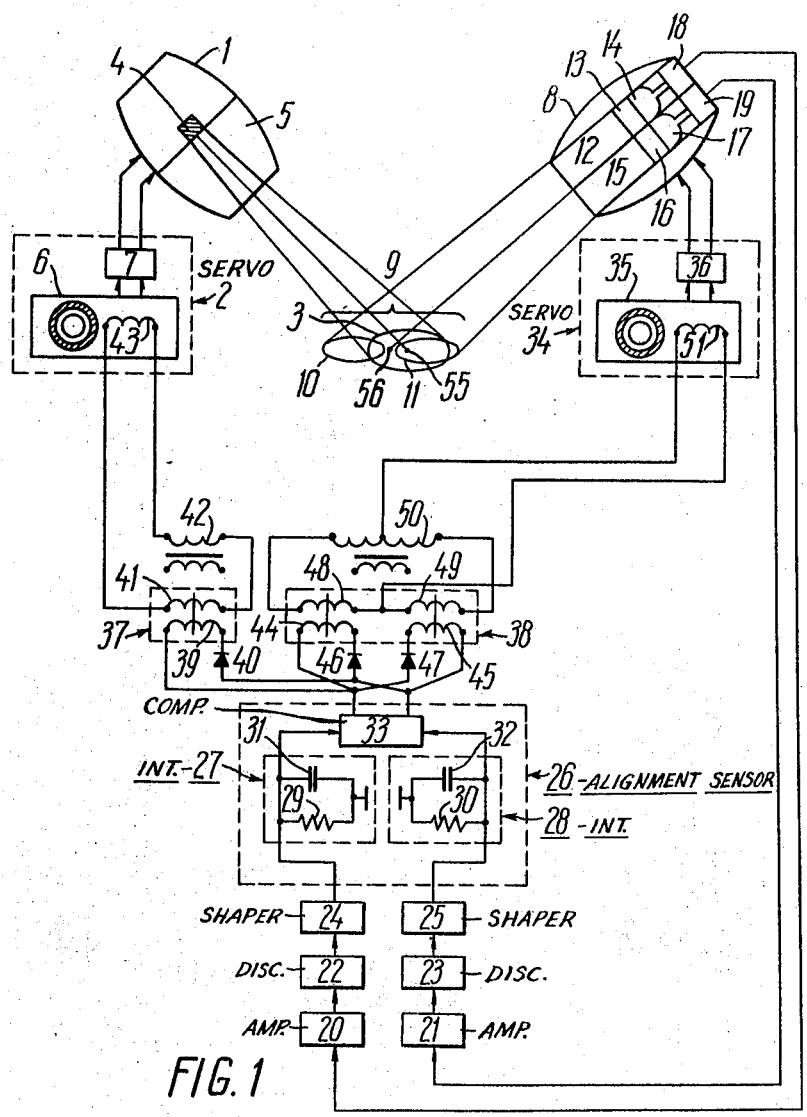
FIG. 1 is a circuit schematic of an apparatus according to the invention.

FIG. 3a, b and c shows the relative alignment of the irradiated and receiving zones secured by the apparatus disclosed herein.

An apparatus for determining the level and profile of a material according to the invention will be described with special reference to determining the level and profile of the stock line in a blast furnace.

One form of the apparatus disclosed herein comprises a collimated radiation source 1 (FIG. 1) actuated by a servo 2 and producing a beam of hard electromagnetic radiation reflected from an irradiated zone 3 on the surface of the blast-furnace stock being gauged (not shown in the drawing).

The hard electromagnetic radiation referred to is the gamma radiation produced by a radioactive isotope 4 enclosed in a phial.

The radiation source 1 comprises a collimator 5 which imparts to the irradiated zone 3 the desired contour. The servo 2 consists of an electric motor 6 and a gear box 7.

The apparatus disclosed herein also comprises a collimated detector 8 for the radiation reflected from the receiving zone which is made up of two half-zones, 10 and 11. The half-zone 10 is produced by a collimator 12 which is followed by a scintillation sensor 13 and a photo-multiplier tube 14, while the half-zone 11 is produced by a collimator 15 followed by a scintillation sensor 16 and a photo-multiplier tube 17.

The outputs of the photo-multiplier tubes 14 and 17 are respectively connected to preamplifiers 18 and 19 which form two outputs for the detector 8. These outputs are connected via the input amplifying stages 20 and 21, discriminating stages 22 and 23, and shaping stages 24 and 25 to the inputs of a means 26 which senses the relative alignment of the irradiated zone 3 and the receiving zone 9. The alignment-sensing means 26 comprises RC integrating networks 27 and 28 composed of resistors 29, 30 and capacitors 31, 32. The integrators 27 and 28 are connected to a comparison stage 33 which is a differential amplifier.

The detector 8 has a servo 34 composed of an electric motor 35 and a gear box 36.

The amplifier 37 is a single-ended magnetic amplifier whose control winding 39 is connected via a diode 40 to the outputs of the comparison stage 33, while the gate winding 41 together with the secondary of a transformer 42 is connected to the control winding 43 of the motor 6.

The amplifier 38 is a push-pull magnetic amplifier whose control windings 44 and 45 are connected to the outputs of the comparison stage 33 via the diodes 46 and 47 respectively, while the gate windings 48 and 49 together with the secondary of a transformer 50 are connected to the control winding 50 of the motor 35.

The quiescent Q-point of the characteristic of the push-pull magnetic amplifier has been positioned so that when there is no current flowing in the control windings 44 and 45, the resistance of the gate windings is very high and equal in both windings, so that the control winding 51 of the motor 35 is fed with a voltage which does not exceed its starting voltage. When a current begins to flow in the control winding 44 or 45 (depending on the sign of the signal corresponding to the amount of misalignment between the irradiated zone 3 and the receiving zone 9), the resistance of either the gate winding 48 or the gate winding 49 goes down, and the control winding 51 of the motor 35 is energized with the voltage coming respectively from the left- or the right-hand half of the secondary of the transformer 50, thereby causing the motor 35 to rotate in the respective direction.

The quiescent Q-point on the characteristic of the single-ended magnetic amplifier has been positioned so that when there is no current flowing in the control winding 39, the resistance of its gate winding 41 is a minimum and the secondary of the transformer feeds the control winding 43 of the motor 6 with a voltage corresponding to the rated speed of the motor. When the control winding 35 is energized with a current due to a misalignment between the irradiated zone 3 and the receiving zone 9 with only one sign, in this case negative, the resistance of its control winding 41 rises, thereby reducing the current in the winding 43 of the motor 6 and, as a consequence, reducing its speed.

In the embodiment just discussed, it is also possible to connect the single-ended magnetic amplifier to the servo 34 of the detector 8 and the push-pull magnetic amplifier to the servo 2 of the radiation source 1, making appropriate changes in the connection of their control windings 39, 44, and 45 to the outputs of the comparison stage 33.

The second embodiment of the apparatus disclosed herein (FIG. 2) is similar in design to the first. The difference consists in that for optimum speed of response and simplified construction of the apparatus the amplifier 38 is a single-ended magnetic amplifier whose control winding 52 is connected to the outputs of the comparison stage 33 via a diode 53, while its gate winding 54 is connected to the control winding 51 of the motor 35. The transformer 42 is placed in the control circuit of both servos 2 and 34.

The quiescent Q-point on the characteristic of the single-ended magnetic amplifier in this embodiment is positioned so that when there is no current flowing in the control winding 25, the resistance of its gate winding 54 is a minimum, and the control winding 51 of the electric motor 35 is energized with the secondary voltage of the transformer 42 corresponding to the rated speed of the motor 35. When a current begins to flow in the control winding 52 due to a misalignment between the irradiated zone 3 and the receiving zone 9 with a sign opposite to that of the signal injected into the control winding 39 (in this case positive), the resistance of its gate winding 54 rises, thereby reducing the current in the control winding 51 of the motor 35 and, as a consequence, reducing its speed.

The apparatus shown in FIG. 1 operates on the following principle.

The gamma radiation emitted by the radioisotope 4, on passing through the collimator 5, produces an irradiated zone 3 on the surface of the stock. The gamma radiation is scattered in the surface layer of the material. The detector 8, aided by the collimators 12 and 15 and the scintillation sensors, picks up the scattered radiation from only two limited half-zones 10 and 11. The sensors 13 and 16 and the photo-multiplier tubes 14 and 17 convert the scattered radiation coming from the half-zones 10 and 11 into electrical pulses which after preamplification in the preamplifiers 18 and 19 go, respectively, to the amplifying stages 20 and 21, then to the discriminating stages 22 and 23 which remove the non-essential part from the pulses. The pulses that pass through the discriminating stages 22 and 23 are shaped by the shaping stages 24 and 25 and are applied to the input of the means 26 sensing the relative alignment of the irradiated zone 3 and the receiving zone 9.

The pulses corresponding to the scattered radiation coming from the half-zone 10 are accepted by the integrator 27, while the pulses corresponding to the scattered radiation coming from the half-zone 11 go to the integrator work 28. The average repetition rate of the pulses reaching each integrator depends on which part of the irradiated zone 3 lies within the respective half-zone, 10 or 11.

The integrators 27 and 28 average the signal, that is, convert it into a d.c. signal whose average value is proportional to average rate of the pulses. The output signals of the integrators 27 and 28 go to the comparison stage 33 which subtracts the signals and delivers across its outputs a signal corresponding to the amount of misalignment between the irradiated zone 3 and the receiving zone 9, having the same sign as the difference.

It will not be assumed that at some instant determined by the process requirements for the stock-line in the blast furnace an auxiliary control unit (not shown in the drawing) starts the motor 6, thereby setting the radiation source 1 in motion so that the irradiated zone 3 begins to move across the surface of the stock from its starting point on the surface being gauged from left to right.

Then, in accordance with the design of the apparatus disclosed herein, the receiving zone 9 will move together with the irradiated zone 3 so as to maintain relative alignment across the entire surface being gauged, thereby automatically determining the coordinates of points on that surface.

In practical operation of the apparatus three cases are likely to occur for the relative alignment of the irradiated zone 3 and the receiving zone 9 on the surface being gauged, as shown in FIG. 3a, b, and c.

In one case, the center 55 (FIG. 3a) of the irradiated zone 3 is to the left of the center 56 of the receiving zone 9. In this case, the part of the irradiated zone 3 lying inside the half-zone 10 is larger than the part of the irradiated zone 3 lying inside the half-zone 11. Because of this, the average rate of the pulse coming to the integrator 27 is higher than that of the pulses accepted by the integrator 28. The signal appearing across the outputs of the comparison stage 33 will be with such a sign that a current will be flowing in the control winding 45 of the push-pull magnetic amplifier.

Owing to the above-mentioned position of the quiescent Q-point of this amplifier, the servo 34 will begin to rotate the detector 8 in the direction in which the misalignment between the irradiated zone 3 and the receiving zone 9 will be minimized, that is clockwise, until the zones reach the position shown in FIG. 3b.

In another case, the center 55 (FIG. 3c) of the irradiated zone 3 is to be right of the center 55 of the receiving zone 9. In this case, the part of the irradiated zone 3 lying inside the half-zone 11 will be larger than the part of the irradiated zone 3 lying inside the half-zone 10. Owing to this, the average rate of the pulses reaching the integrator 28 will be higher that that of the pulses accepted by the integrator 27. The signal appearing across the outputs of the comparison stage 33 will be with such a signal that a current will be flowing in the control winding 44 of the push-pull magnetic amplifier.

Then, in accordance with the above-mentioned position of the quiescent Q-points of these magnetic amplifiers, the servo 34 will begin to rotate the detector in the direction in which the misalignment between the irradiated zone 3 and the receiving zone 9 will be minimized (FIG. 3c), that is counter-clockwise, until the zones are in the position shown in FIG. 3b.

Thus, the push-pull magnetic amplifier causes the irradiated zone 3 and the receiving zone 9 to move in relative alignment across the surface of the stock being gauged, provided the controlling rate of travel of the irradiated zone 3 corresponding to the dynamic and kinematic characteristics of the servo 34.

The point is that if for one reason or another the rate of travel of the irradiated zone 3 should rise above the maximum rate of travel of the receiving zone 9 secured by the servo 34, the misalignment between the two zones will exceed the limits of error, and with a further increase in the rate of travel of the irradiated zone 3 the gauging of the level and profile cannot be effected with only one push-pull magnetic amplifier controlling the servo 34. If the rate of travel of the irradiated zone is, on the other hand, adjusted so that it does not exceed the maximum rate of travel of the receiving zone at any point on the surface being gauged, there over the greater part of the surface the gauging process will be conducted at a rate considerably lower than that can be secured by the servo 34, and the speed of response of the apparatus will be less than optimum.

As already stated, to obviate this disadvantage the apparatus comprises a single-ended magnetic amplifier which controls the servo 2 and whose control winding 39 is energized with the current produced by the comparison stage 33 when the irradiated zone 3 is out of alignment wiht the receiving zone 9, as shown in FIG. 3c.

In accordance with the above-mentioned position of its quiescent Q-point, the single-ended magnetic amplifier will begin to reduce the speed of the servo 2 simultaneously with operation of the push-pull magnetic amplifier, thereby bringing down the controlling rate of travel of the irradiated zone 3, which serves to minimize the misalignment between the irradiated zone 3 and the receiving 9 and to speed up the restoration of alignment between the two zones.

This joint operation of the single-ended and push-pull magnetic amplifiers results in gauging with an optimum speed of response, because the rate of travel of the irradiated zone 3 is slowed down only over the parts of the profile where the servo 34 cannot secure the requisite rate of travel for the receiving zone.

The second embodiment of the apparatus (FIG. 2) operates in a manner similar to the first embodiment (FIG. 1). The difference is this.

At a definite instant, an auxiliary control unit (not shown in the drawing) starts the motors 6 and 35 (FIG. 2) so that the irradiated zone 3 and the receiving zone 9 begin their travel across the surface of the stock from their starting points from left to right simultaneously. Then, in accordance with the construction of the apparatus disclosed herein, the irradiated zone 3 and the receiving zone 9 will travel across the entire surface being gauged in relative alignment.

Actually, three cases of relative alignment between the irradiated zone 3 and the receiving zone 9 on the surface of the blast-furnace stock, shown in FIG. 3a, b and c, may occur in operation of a practical apparatus.

At a definite instant the center 56 (FIG. 3b) of the receiving zOne 9 may be coincident with the center 55 of the irradiated zone 3. Then, equal parts of the irradiated zone 3 will lie inside the half-zones 10 and 11, owing to which the integrators 27 and 28 will accept pulses at the same rate. The output signal of the comparison stage 33 will be zero, and the current in the control windings 39 and 52 of the two single-ended magnetic amplifiers will be also zero. Then, in accordance with the above-mentioned position of their quiescent Q-points, the magnetic amplifiers will secure a maximum speed for their respective servos 2 and 34.

The irradiated zone 3 and the receiving zone 9, as they move jointly, may occupy the position shown in FIG. 3a, that is the receiving zone 9 leads the irradiated zone 3. Then, in accordance with the foregoing, the signal appearing across the outputs of the comparison stage 33 will be with a sign such that a current will be flowing in the control winding 52 of the single-ended magnetic amplifier controlling the servo 34, which, in accordance with the position of its quiescent Q-point, will reduce the speed of the servo 34, thereby enabling the irradiated zone 3 to catch up with the receiving zone 9.

The irradiated zone 3 and the receiving zone 9, as they move jointly, may occupy the position shown in FIG. 3c. Then, in accordance with the foregoing, the signal appearing across the outputs of the comparison stage 33 will be with a sign such that a current will be flowing in the control winding 39 of the single-ended magnetic amplifier controlling the servo 2, which in accordance with the position of its quiescent Q-point will bring down the speed of the servo 2, thereby enabling the receiving zone to catch up with the irradiated zone 3.

In jointly controlling the servos 2 and 34 as described just above, the single-ended magnetic amplifiers insure that the surface of the stock is gauged with an optimum speed of response and the desired accuracy, while the construction of the apparatus is materially simplified.

The apparatus disclosed herein insures the gauging of profiles widely varying in complexity with a low dynamic error, and this error is guaranteed to remain below a predetermined value, regardless of the form of the profile. Thus, the apparatus need not be checked for its dynamic error, which is a major advantage for an apparatus providing a check on the variables of the blast-furnace process, because the stockline gauge of an operating blast furance cannot be checked or calibrated once it is installed.

Besides, the apparatus disclosed herein automatically adjust the time necessary to gauge the stock-line according to the level and character of the surface, and also according to the activity of the radiation source, so that it is always operating at an optimum relation between the specified accuracy of measurement, the activity of the source, and the time of gauging, thereby securing the collection of a maximum amount of information about the state of the stock compatible with the design potentialities of the apparatus.

What is claimed is:

1. An apparatus for determining the level and profile of materials, said apparatus comprising a collimated radiation source producing a beam of hard electromagnetic radiation and an irradiated zone on the surface being gauged; a collimated detector having a receiving zone and picking up the radiation reflected from said receiving zone; alignment-sensing means to sense the relative alignment between said irradiated and receiving zones, said means being electrically connected to said detector; a first amplifier electrically connected to said alignment-sensing means to accept signals corresponding to the amount of misalignment between said irradiated and receiving zones; a second amplifier electrically connected to said alignment-sensing means to accept signals corresponding to the amount of misalignment of said irradiated and receiving zone with only one sign; a first servo actuating either said source or said detector and controlled by the first amplifier in accordance with signals received thereby; and a second servo actuating either said detector or said source and controlled by the second amplifier in accordance with said signals received thereby, according to the magnitude of which the speed of the second servo is reduced.

2. An apparatus, as claimed in claim 1, in which the first amplifier is arranged so that it accepts signals corresponding to the amount of misalignment between said irradiated and receiving zones with a sign opposite to that of the signals coming to the second amplifier, according to the magnitude of which the first amplifier reduces the speed of the first servo.

* * * * *